June 20, 1950 P. W. NIPPERT 2,512,285
COURSE INDICATOR FOR MAPS
Filed March 21, 1945

Inventor
Paul W. Nippert
By W. S. McElroy
Attorney

Patented June 20, 1950

2,512,285

UNITED STATES PATENT OFFICE 2,512,285

COURSE INDICATOR FOR MAPS

Paul W. Nippert, Columbus, Ohio

Application March 21, 1945, Serial No. 584,010

2 Claims. (Cl. 33—137)

This invention relates to course-indicating guides for use in association with topographical maps, and has for its general object to provide an improved method and means for facilitating the reading of such maps for ascertaining in a quick, convenient and accurate manner positional information derivable therefrom.

In the navigation of aircraft particularly, pilots commonly are supplied with foldable topographical maps. In the use of these maps, it is the ordinary practice for a pilot, preparatory to undertaking a cross-country flight, to draw a straight reference line on the map from the point of departure to that of the final destination, or other intermediate point within the limits of the map. During flight, the pilot may determine his position from time to time by comparing the physical aspects of the viewable terrain with indications thereof provided on the map immediately adjacent the route or reference line. However, it is often a difficult matter for a pilot to pick up such a map and quickly read it, even when the map is marked with the course-indicating lines. This is due to the fact that the pilot frequently must devote his attention to the operation of the airplane controls and if his attention is too long distracted by map study or observation, he may find himself off his intended course or flying at an undesirable altitude. Also, such maps are somewhat bulky so that it is common for the aviator to fold the same to permit a limited section or panel thereof to be viewed at any one time. After a given area has been traversed, refolding of the map is required to present other panels of the map to view. During this folding or panel changing, the route line is momentarily lost to quick view and often some close study or attention is required to locate it. Again, when such maps are used repeatedly, they become so marked up with various course-indicating lines as to confuse or prevent the pilot from obtaining a quick and accurate reading of the map.

To avoid or minimize these and other difficulties, the present invention provides a course guide which comprises a transparent flexible strip of material adapted to be adhesively and detachably applied over the face of a map, the strip having applied thereto a straight course-indicating line and, preferably, the body of the strip possesses a distinctive coloration contrasting with that of the map surface, whereby through the use of the guide, the pilot upon picking up a map to which the guide has been applied may see instantly and without effort the route thereon to be followed, thus reducing the time required to study maps and enabling the pilot to determine flying positions with greater ease, accuracy and facility than heretofore.

For a further understanding of the invention, and other objects and advantages thereof, reference is to be had to the following description and the accompanying drawing, wherein.

Figure 1:
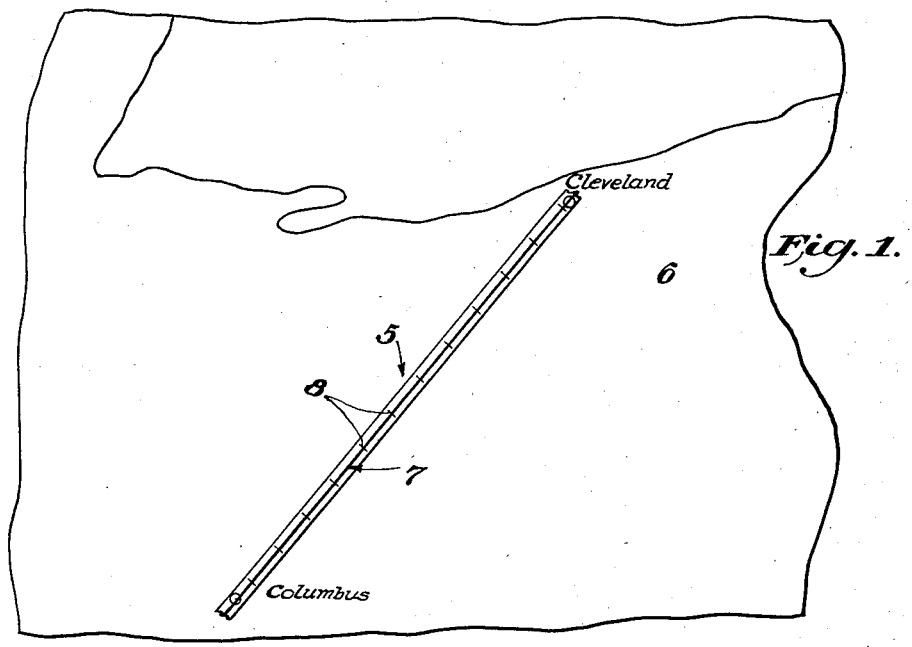
Fig. 1 is a fragmentary plan view of a topographical map showing my improved course-indicating guide applied thereto.
Figures 2, 3:
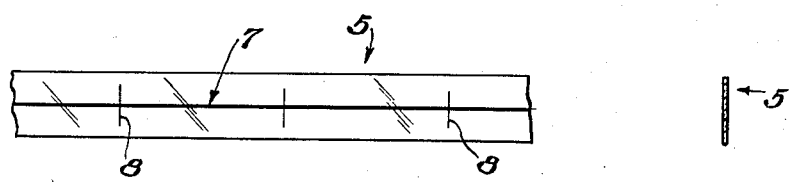
Fig. 2 is a top plan view of the guide removed from the map.
Fig. 3 is a vertical transverse sectional view.
Figure 4:
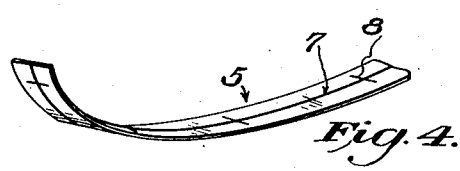
Fig. 4 is a fragmentary perspective view of the guide.

My improved map guide, indicated in its entirety by the numeral 5, is formed from a flexible, substantially transparent strip of material which may be formed from one or more of the so-called plastics known commercially as cellophane, Scotch tape, neoprene or the like. Preferably, the under side of the tape carries an adhesive so that the strip or tape may be applied flatly to the face of a standard topographical map or chart 6, particularly maps or charts of the type supplied by the United States Coast and Geodetic Survey. When used on such a standard chart, the width of the guide strip or tape will be such as to correspond to an area representing four miles on said chart and within the limits of which a pilot flying with the use of the guide will be on course. The strip has printed or otherwise applied thereto in its middle a straight course-indicating line 7, this line being intercepted at intervals, representing ten miles on the associated chart, by transverse markings 8. It is an advantage in the use of the guide that the body composition of the latter should be distictively colored, so that it will contrast with the colorations used on the map or chart.

In the use of the guide, assuming that a pilot desires to fly from the city of Columbus to that of Cleveland, Ohio, as depicted in the drawings, a length of tape is severed from a spirally wound roll, the length corresponding to the distance between the cities of Columbus and Cleveland as denoted on the map. The strip is then applied to the face of the map with the course line 7 thereon registering with the starting and destination points. Due to the transparency of the guide strip or tape, the designations on the map surface beneath the same are clearly viewable and may be read with convenience and clarity. By its distinctive color, the pilot when picking up a map may, without confusion or hunting, ascertain immediately the route which he is following and this is true even when the map is folded to present relatively small sections or panels thereof to the pilot's view at any one time. The upper surface of the strip or tape is capable of receiving fountain pen ink, so that as the pilot proceeds along his course, he may note his flying time thereon, such notations being usually made adjacent to the transverse markings 8. Upon the conclusion of the flight, the tape or guide may be readily removed from the surface of the map, thus leaving the latter free from all pilot-applied extraneous markings, and enabling the map to be used repeatedly and read without confusion.

My guide has the additional advantage of being simple and inexpensive to use in that it does not deface the map or chart to which it is applied. I have found that when the tape is uniformly colored to possess a light blue hue, it contrasts most favorably with ordinary map coloration, particularly land maps, although any other desired color may be employed.

I claim:

1. In combination with a foldable topographical map, a navigational aid foldable with the map for indicating and marking on the face of the map a preselected course having fixed limits extending both longitudinally and latitudinally on said map, comprising a transparent and flexible strip of tape coated with non-hardening adhesive adapted to be removably attached to the face of the map to connect a departure point with an arrival point without obstructing visibility of the map surface beneath; said tape having a predetermined width measured in units of the map scale marking safe allowable departure limits from the selected course; indicia printed on the tape in the form of a straight line extending lengthwise along the tape marking the selected and "on" course position over the map surface; a plurality of indicia extending transversely to said line at regularly spaced intervals and forming a scale marked in units of the map scale for computing distance traveled along the selected course; and said tape having an indicia receiving surface along said line for plotting observations relative to departures along the course.

2. In combination with a foldable topographical map, a navigational aid foldable with the map for indicating and marking on the face of the map a preselected course having fixed limits extending both longitudinally and latitudinally on said map, said aid being formed from a transparent and flexible strip of tape colored to contrast with the coloring of said map and having a non-hardening adhesive coating thereon providing for removably attaching the tape on the face of the map to connect a departure point with an arrival point without obstructing visibility of the map surface beneath; indicia printed on the tape in form of a straight line extended lengthwise along the tape marking the selected and "on" course position over the map surface; a plurality of indicia extending transversely along said line at regularly spaced intervals and forming a scale marked in units of the map scale for computing distance traveled along the selected course; said tape having a predetermined width measured in units of the map scale establishing and marking the boundaries on each side of the "on" course position within which a safe departure from the selected course may be made; and said tape having an indicia receiving surface along said line for plotting observations relative to departures along the course.

PAUL W. NIPPERT.

REFERENCES CITED

The following references are of record in the file of this patent:

UNITED STATES PATENTS

| Number | Name | Date |
|---|---|---|
| 846,006 | Bryson | Mar. 5, 1907 |
| 1,116,918 | Putnam et al. | Nov. 10, 1914 |
| 1,969,939 | Nelson | Aug. 14, 1934 |
| 2,177,627 | Drew | Oct. 31, 1939 |

FOREIGN PATENTS

| Number | Country | Date |
|---|---|---|
| 406,486 | Great Britain | Mar. 1, 1934 |